(12) United States Patent
Denpo

(10) Patent No.: US 7,936,470 B2
(45) Date of Patent: May 3, 2011

(54) INFORMATION DISPLAY MODES FOR A COMMUNICATION DEVICE

(75) Inventor: Toshiaki Denpo, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1017 days.

(21) Appl. No.: 11/188,731

(22) Filed: Jul. 26, 2005

(65) Prior Publication Data

US 2006/0023262 A1 Feb. 2, 2006

(30) Foreign Application Priority Data

Jul. 27, 2004 (JP) ................................. 2004-218758

(51) Int. Cl.
*G06F 3/12* (2006.01)

(52) U.S. Cl. ........ 358/1.15; 358/468; 358/442; 358/474

(58) Field of Classification Search .......... 358/1.1–1.16, 358/468, 442, 474
See application file for complete search history.

(56) References Cited

U.S. PATENT DOCUMENTS

| | | | | |
|---|---|---|---|---|
| 4,947,345 A | * | 8/1990 | Paradise et al. | 358/442 |
| 5,390,003 A | | 2/1995 | Yamaguchi et al. | |
| 5,608,546 A | * | 3/1997 | Nakamura et al. | 358/468 |
| 5,809,428 A | * | 9/1998 | Garahi et al. | 455/517 |
| 6,417,934 B1 | * | 7/2002 | Sadr-Salek | 358/442 |
| 6,577,907 B1 | * | 6/2003 | Czyszczewski et al. | 358/442 |
| 6,633,413 B1 | * | 10/2003 | Schlank et al. | 358/468 |

FOREIGN PATENT DOCUMENTS

| | | |
|---|---|---|
| JP | 06-178066 A | 6/1994 |
| JP | 7-007596 A | 1/1995 |
| JP | 09-321970 A | 12/1997 |
| JP | 2001-339480 A | 12/2001 |
| JP | 2002135502 | 5/2002 |
| JP | 2002-320043 A | 10/2002 |

OTHER PUBLICATIONS

JP Office Action dtd Jan. 19, 2010, JP Appln. 2004-218758, English Translation.
Notification of Reasons of Rejection mailed Jul. 7, 2009 in Japanese Application No. 2004-218758 and English translation thereof.

* cited by examiner

*Primary Examiner* — Benny Q Tieu
*Assistant Examiner* — Michael Tzeng
(74) *Attorney, Agent, or Firm* — Banner & Witcoff, Ltd.

(57) ABSTRACT

A communication device is connectable to a terminal device, which can perform a data communication with the communication device. The communication device is capable of receiving data through another communication device via a communication network. The communication device may include a data storing system that stores data received from the other communication device through the communication network, a data transmitting system that transmits the data stored in the data storing system, a data counting system that counts the number of pieces of data stored in the data storing system and have not yet been transmitted to the terminal device, and an indicating system that indicates the number of pieces of data counted by the data counting system.

10 Claims, 9 Drawing Sheets

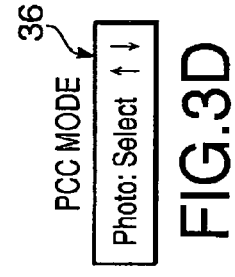
FIG.3D
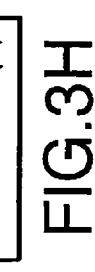
FIG.3H
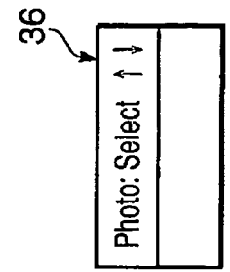
FIG.3L
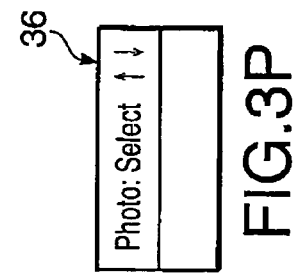
FIG.3P
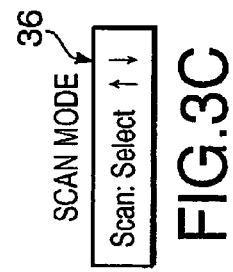
FIG.3C
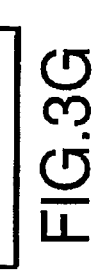
FIG.3G
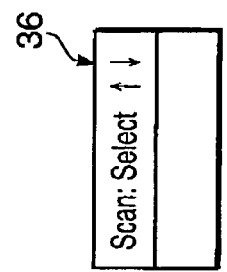
FIG.3K
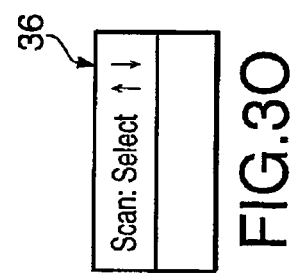
FIG.3O
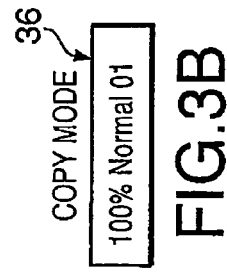
FIG.3B
FIG.3F
FIG.3J
FIG.3N
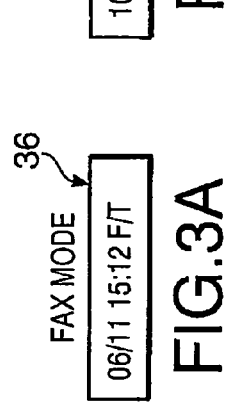
FIG.3A
FIG.3E
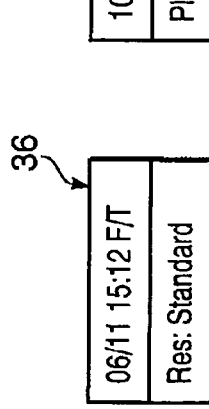
FIG.3I
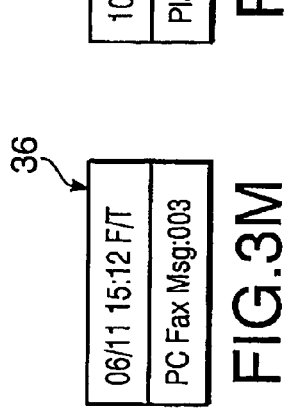
FIG.3M

INFORMATION DISPLAY MODES FOR A COMMUNICATION DEVICE

CROSS REFERENCE TO RELATED APPLICATIONS

This application claims priority from Japanese Patent Application No. 2004-218758, filed on Jul. 27, 2004. The entire subject matter of the priority application is incorporated herein by reference.

BACKGROUND

1. Technical Field

Aspects of the invention relate to a multi function device (MFD), particularly to the MFD having a facsimile function in which received facsimile data can be transmitted to a personal computer (PC) connected to the MFD.

2. Related Art

PC-Facsimile functions are know in which the functions, implemented in facsimile devices, transmit received facsimile data to a PC connected to the facsimile device. If the PC is powered off when the facsimile device attempts to transmit received facsimile data to the PC or if, on the PC side, a dedicated application for communicating with the facsimile data transmitted from the facsimile, the PC-Facsimile function does not work. In such a case, the facsimile device outputs an error report notifying that the data have not been transmitted.

Japanese Patent Provisional Publication No. P2002-135502A (hereinafter, referred to as JP 2002-135502) discloses a method of connecting a PC and a facsimile device. The method as disclosed defines steps of storing image data received by the facsimile device in a storage, starting to transmit the stored image data to the PC, causing the PC to start TWAIN (Technology Without Any Interested Name) devices, starting to transmit the stored image data to the PC at a predetermined time, etc. transmitting the received and stored image data in the storage. Further, according to JP 2002-135502, if the received data is stored in the storage, a lamp is lit to notify a used that there is received data.

In such a configuration, there is a problem as follows. When the lamp is lit, the user recognizes that there is received data. However, if the user defers the transmission of the stored data from the facsimile device to the PC because of some reason, a storage capacity may be consumed. In such a case, newly received facsimile data may not be stored any more. Further, if the facsimile device is a function of the MFD, and the notification of the stored data is made in addition to information to be displayed in a currently selected function/operation mode, the entire display would be complicated for a typical user.

SUMMARY

Aspects of the present invention provide an improved MFD in which information regarding the received data is displayed appropriately.

BRIEF DESCRIPTION OF THE ACCOMPANYING DRAWINGS

Figure 1:
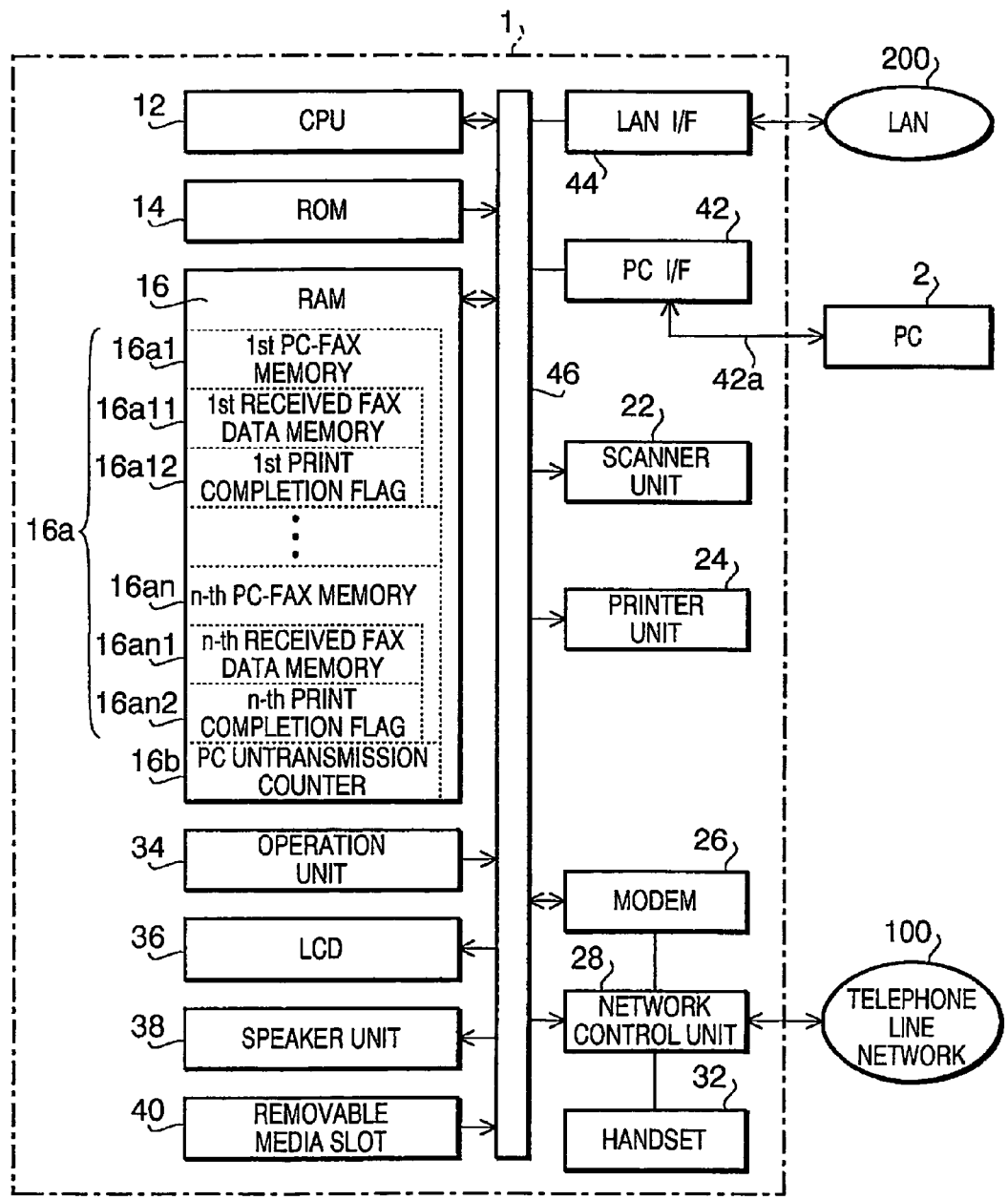
FIG. 1 is a block diagram showing a configuration of a communication system including an MFD according to a first embodiment of the invention in accordance with aspects of the present invention.

FIGS. 3A-3P schematically show examples of indications displayed on an LCD of the MFD shown in FIG. 1 in various operation mode in accordance with aspects of the present invention.

Figure 4:
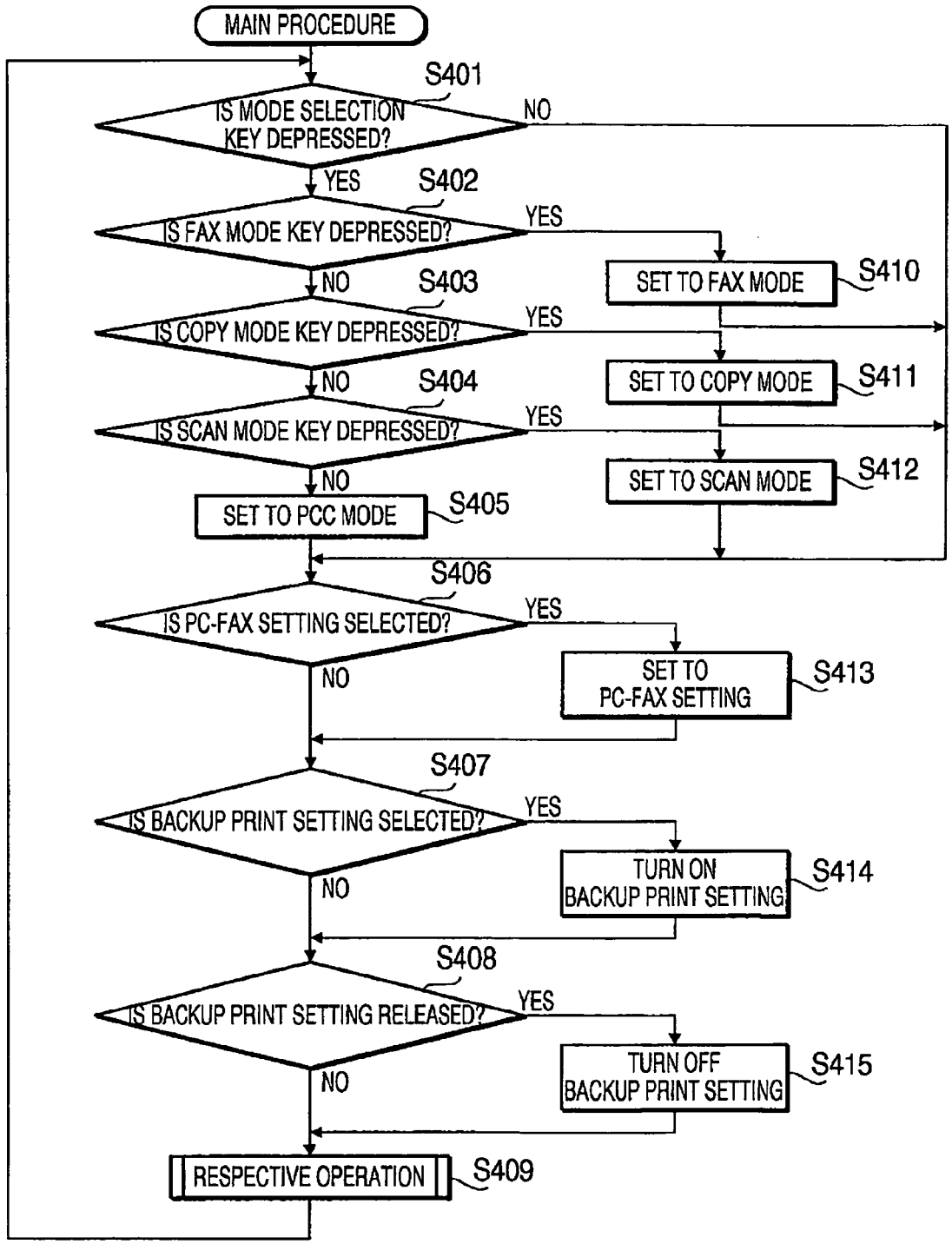

FIG. 4 is a flowchart illustrating a main procedure executed in the MFD shown in FIG. 1 in accordance with aspects of the present invention.

Figure 5:
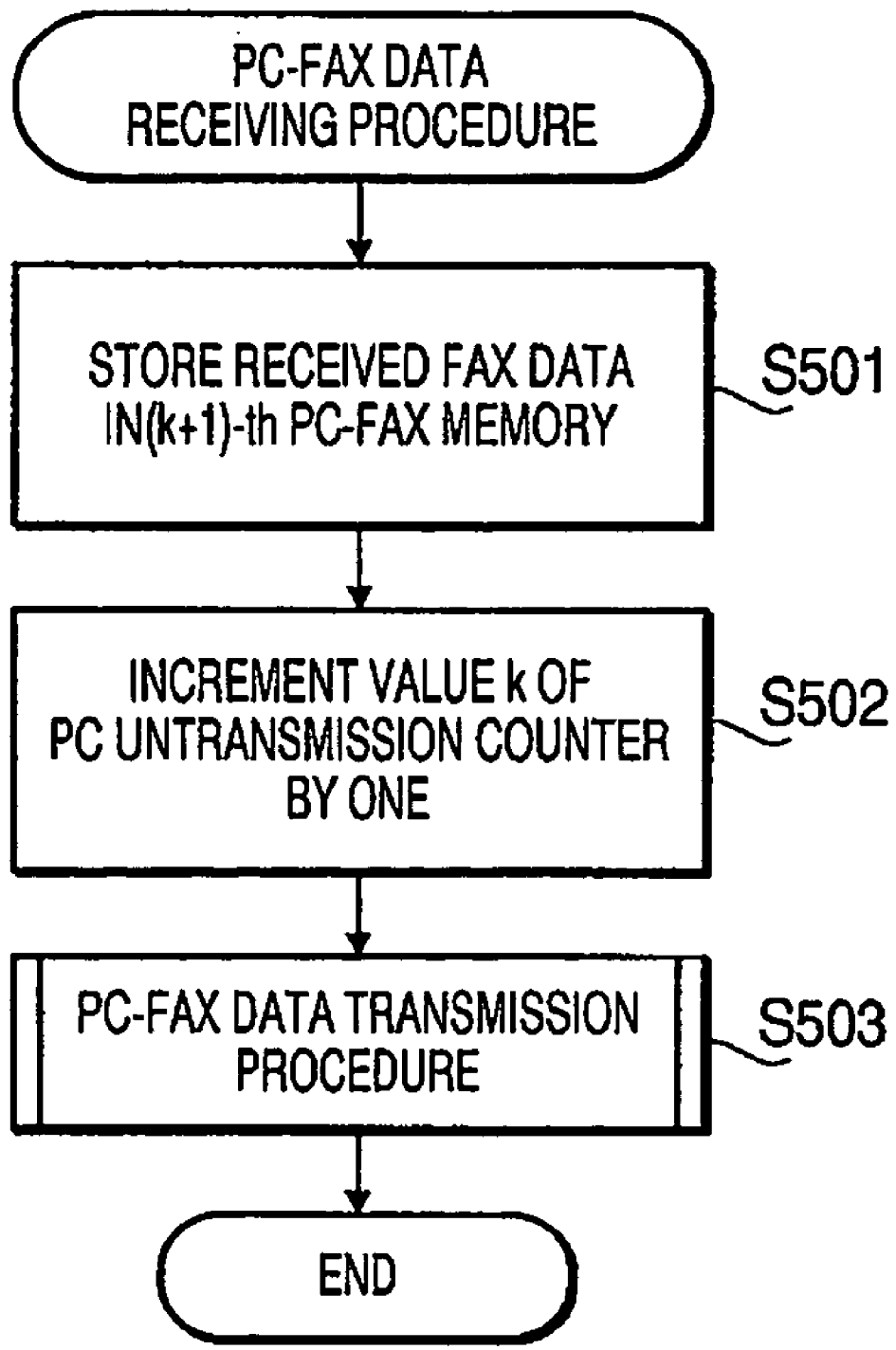

FIG. 5 is a flowchart illustrating a PC-FAX data receiving procedure in accordance with aspects of the present invention.

Figure 6:
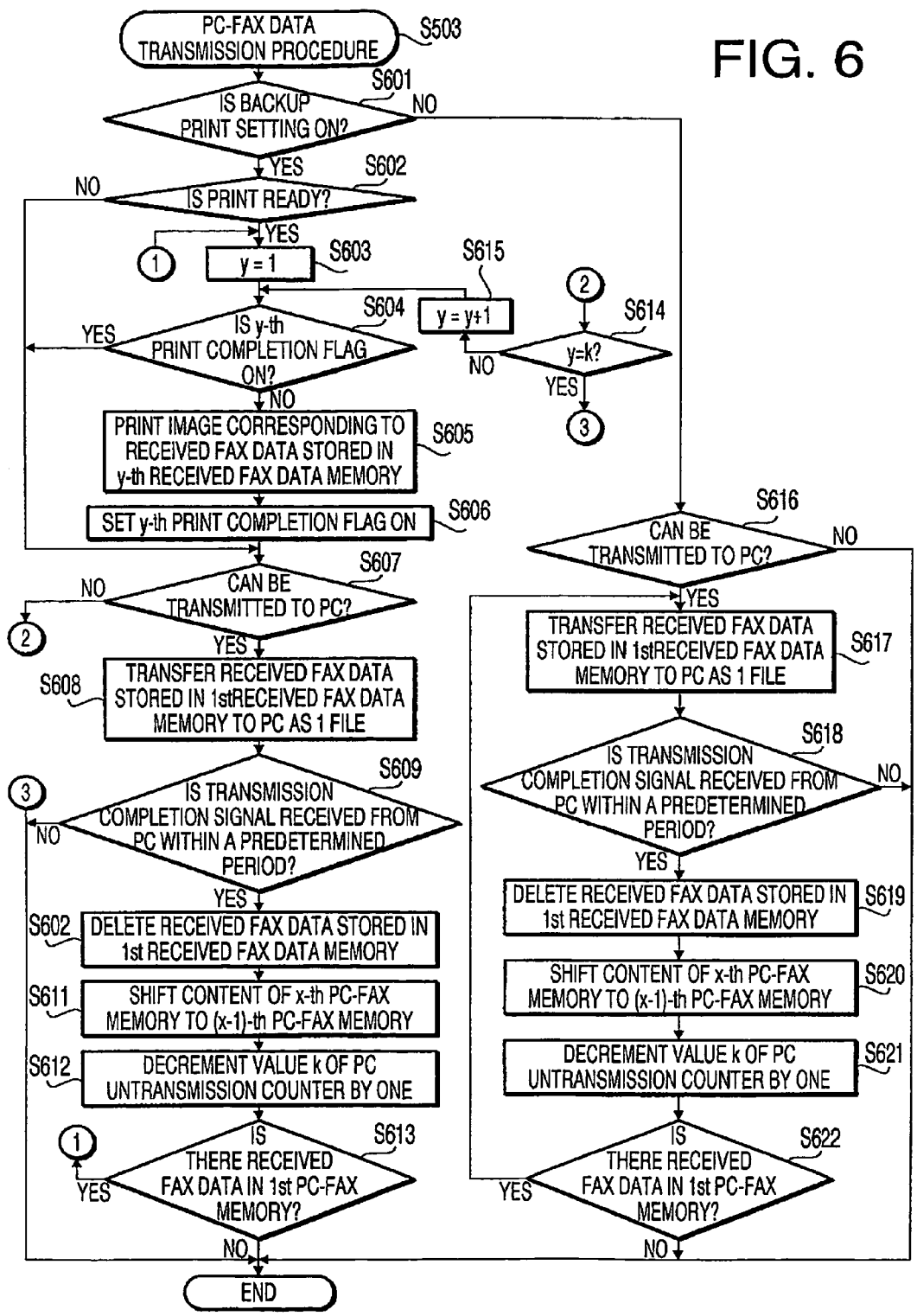

FIG. 6 is a flowchart illustrating a PC-FAX data transmitting procedure according to a first embodiment in accordance with aspects of the present invention.

Figure 7:
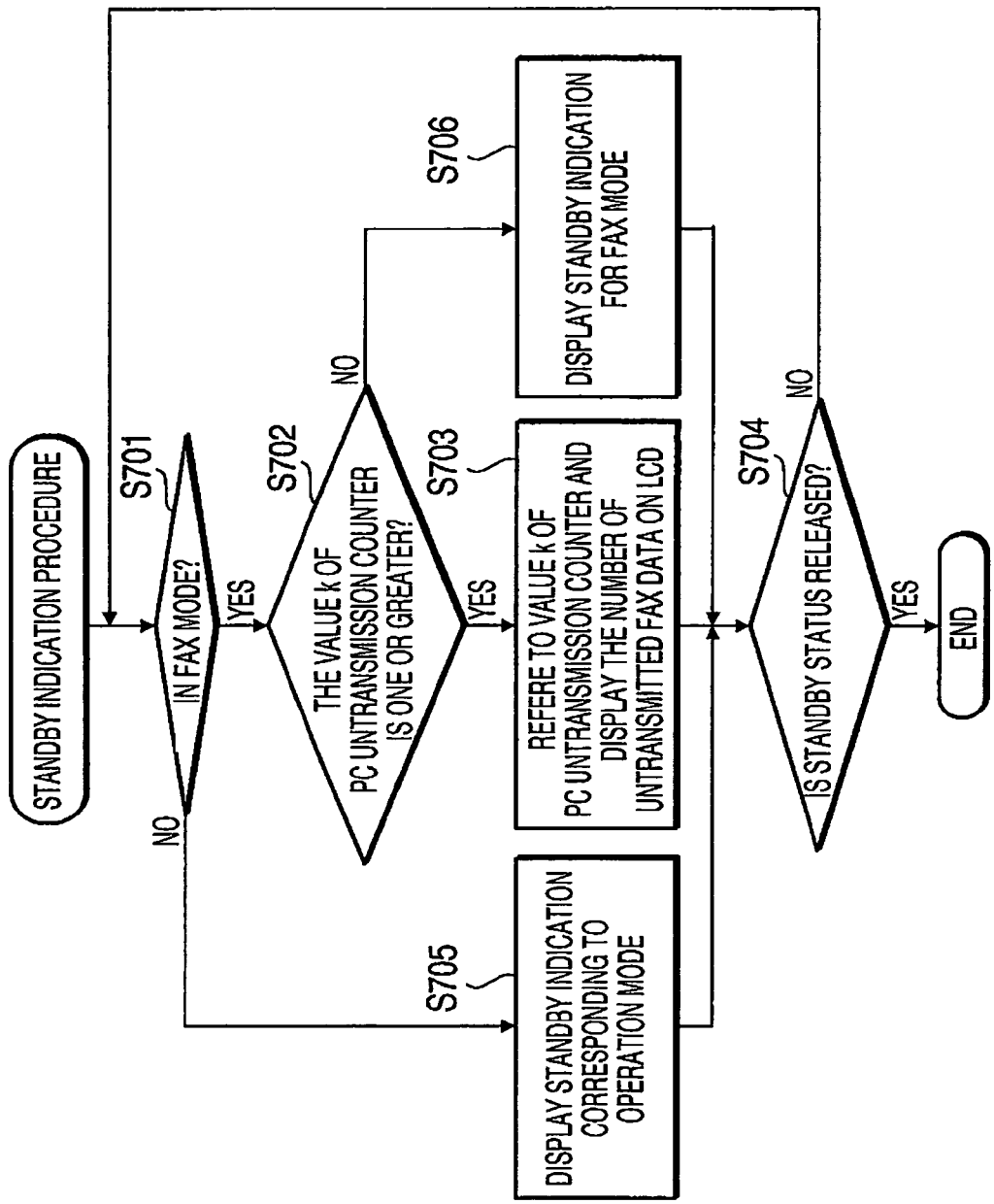
Figure 8:
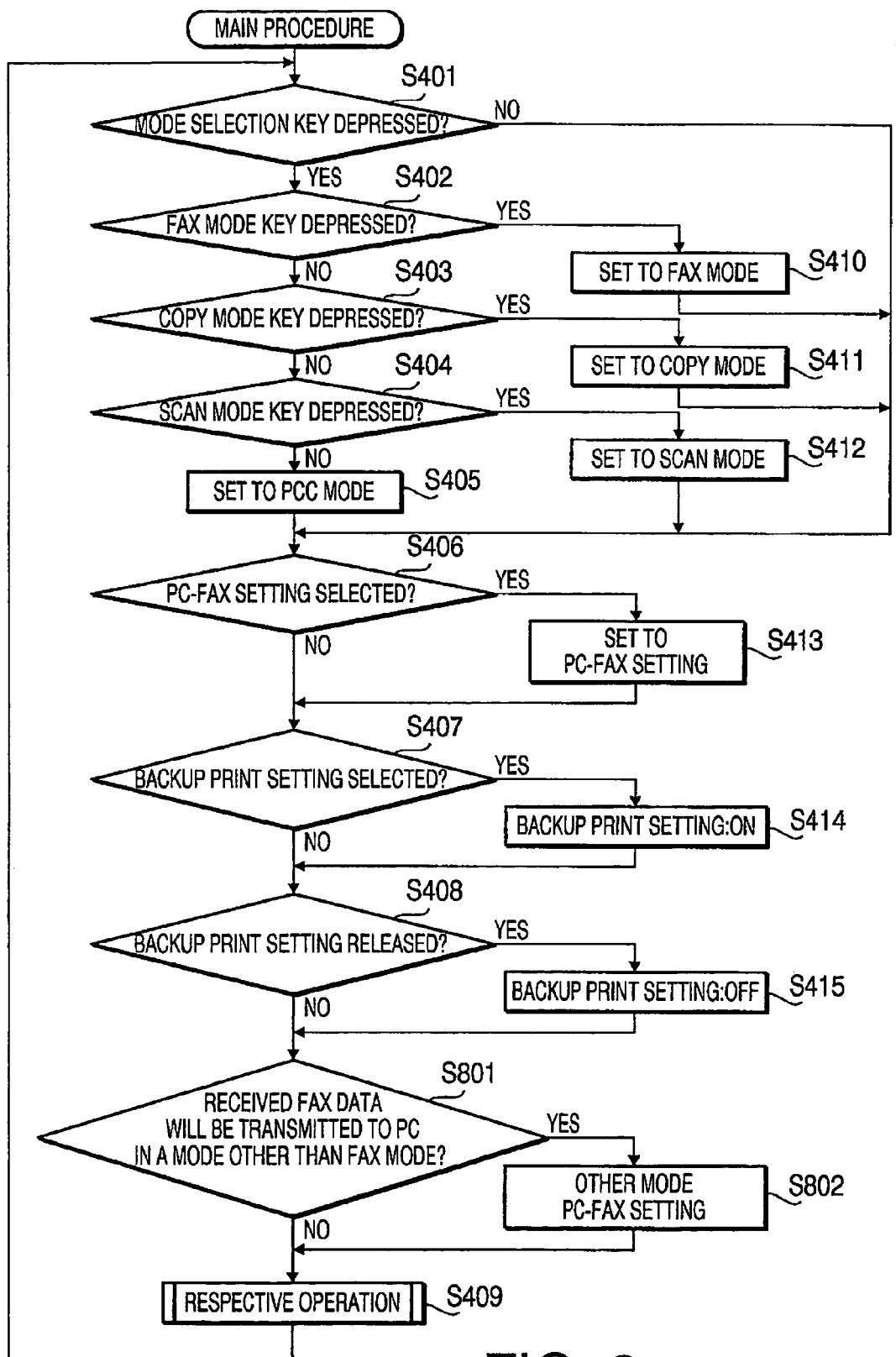

FIG. 7 is a flowchart illustrating a standby displaying procedure according to the first embodiment;

FIG. 8 is a flowchart illustrating a PC-FAX data transmitting procedure according to a second embodiment in accordance with aspects of the present invention.

Figure 9:
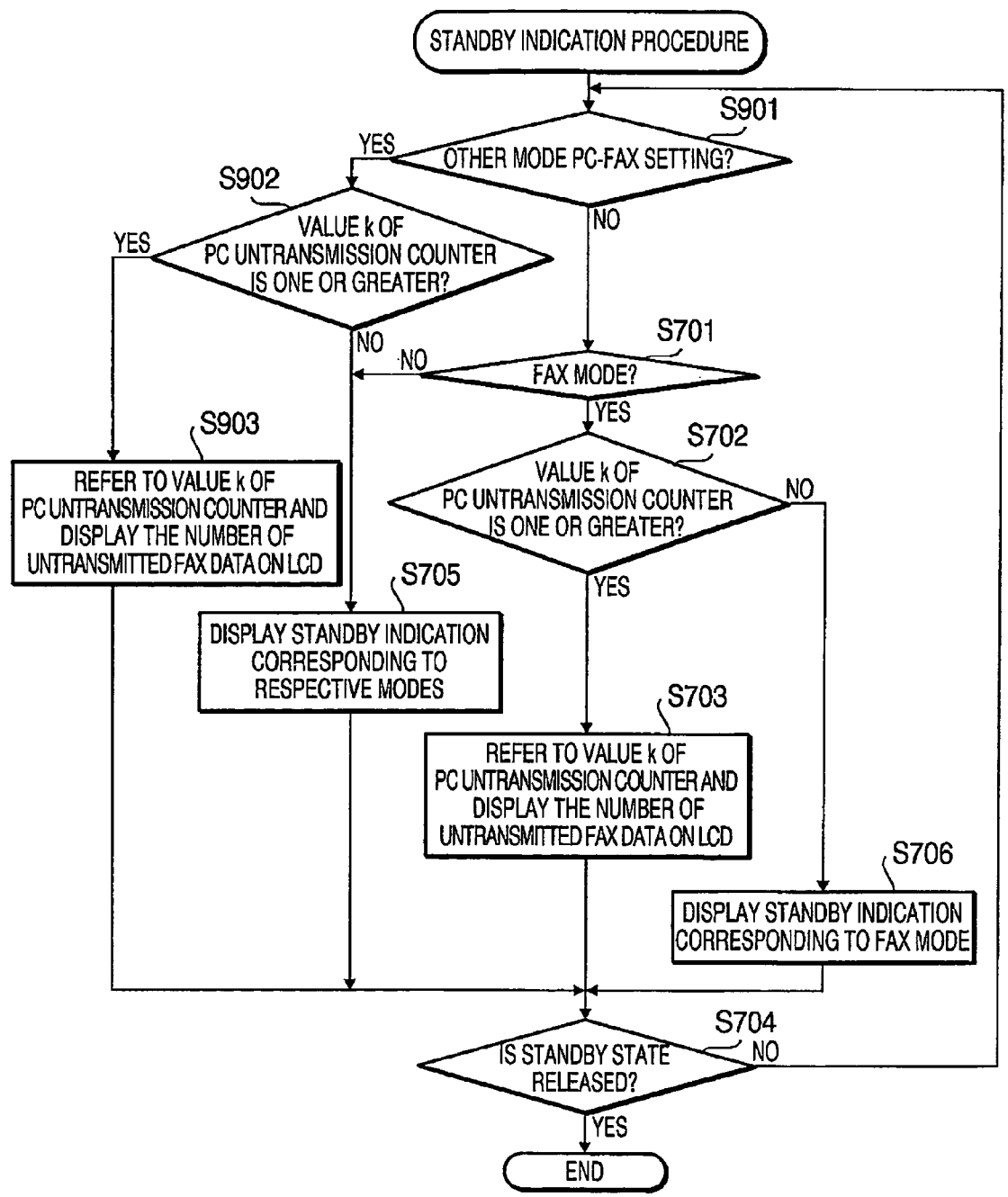

FIG. 9 is a flowchart illustrating a standby displaying procedure according to the second embodiment in accordance with aspects of the present invention.

DETAILED DESCRIPTION

General Overview of Aspects of the Invention

According to some aspects of the invention, there is provided a multi function device having a function of a facsimile device and a function of a non-facsimile device, the multi function device being connectable to a terminal device that can perform a data communication. The multi function device may be provided with a mode setting system configured to set the multi function device to operate to realize one of the function of the facsimile device and the function of the non-facsimile device, a displaying system that displays indication corresponding to the mode set by the mode setting system, a data receiving system that receives data transmitted from another device, a data storing system that stores the data received by the data receiving system, a data transmission setting system that sets whether the data received by the data receiving system is to be transmitted to the terminal device, a data transmitting system that transmits the data received by the data receiving system to the terminal device if the data transmission setting system sets that the data received by the data receiving system is to be transmitted to the terminal device, an untransmitted data counting system that counts the number of pieces of untransmitted data that are stored in the received data storing system and have not yet been transmitted to the terminal device by the data transmitting system, and a first untransmitted data number displaying system that displays the number of pieces of the untransmitted data counted by the untransmitted data counting system when the operation mode set by the mode setting system is the a facsimile mode. It is noted that various connections are set forth between elements in the following description. It is noted that these connections in general and unless specified otherwise, may be direct or indirect and that this specification is not intended to be limiting in the respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage and the like.

The multi function device may further include a non-facsimile mode data transmitting system that sets whether the data received by the data receiving system is to be transmitted to the terminal device if the mode setting system sets the operation mode of the multi function device to the non-facsimile mode, and a second untransmitted data number displaying system that displays the number of untransmitted data counted by the non-transmission data counting system on the displaying system if the non-facsimile mode data transmitting system sets that the data received by the data receiving system is to be transmitted to the terminal device.

The multi function device may further include a transmitting condition detecting system that detects whether the data transmitting system is capable of transmitting the data to the terminal device. The first untransmitted data number displaying system and the second untransmitted data number displaying system may display the number of pieces of the untransmitted data counted by the untransmitted data counting system on the displaying system at least when the transmitting condition detecting system detects that the transmission of the data is not available.

The multi function device may further include a transmitting condition detecting system that detects whether the data transmitting system is capable of transmitting the data to the terminal device. The data transmitting system may transmit the untransmitted data stored in the data storing system such that a unit of untransmitted data is transmitted as a single file to the terminal device when the transmitting condition detecting system detects that the transmission of the data is available.

The multi function device may further include a normal transmission judging system that judges whether data transmission is carried out successfully when the data received by the date receiving system is transmitted to the terminal device by the data transmitting system, and a data deleting system that deletes data corresponding to the transmitted data from the received data storing system when the normal transmission judging system determines that the transmission of the data is carried out successfully.

The multi function device may further include a backup recording system that records an image corresponding to the data received by the data receiving system on a recording medium if the data transmission setting system sets that the data received by the data receiving system is to be transmitted to the terminal device.

The multi function device may further include a backup recording setting system that sets whether the backup recording system should record the image corresponding to the data received by the data receiving system on the recording medium if the data transmission setting system sets that the data received by the data receiving system is to be transmitted to the terminal device.

The multi function device may further include a normal transmission judging system that judges whether data transmission is carried out successfully when the data received by the date receiving system is transmitted to the terminal device by the data transmitting system, and a data retaining system that retains data corresponding to the transmitted data in the received data storing system until the normal transmission judging system determines that the transmission of the data is carried out successfully.

According to other aspects, there is provided a communication device connectable to a terminal device which can perform a data communication with the communication device. The communication device is capable of receiving data through another communication device via a communication network. The communication device may include a data storing system that stores data received from the other communication device through the communication network, a data transmitting system that transmits the data stored in the data storing system, a data counting system that counts the number of pieces of data stored in the data storing system and have not yet been transmitted to the terminal device, and an indicating system that indicates the number of pieces of data counted by the data counting system.

The communication device may further include a normal transmission judging system that judges whether data transmission is carried out successfully when the data stored in the data storing system is transmitted to the terminal device, and a data deleting system that deletes data corresponding to the transmitted data from the data storing system when the normal transmission judging system determines that the transmission of the data is carried out successfully.

The communication device may further include a backup recording system that records an image corresponding to the data received by the data receiving system on a recording medium if the data transmission setting system sets that the data stored in the data storing system is to be transmitted to the terminal device.

The communication device may be configured such that the indicating system may indicate the number of pieces of data counted by the data counting system only when the communication device is in a standby state.

The communication device may operate in any one of a plurality of operation modes including a mode in which the communication device has a function of a facsimile device, and the indicating system may indicate the number of pieces of data counted by the data counting system only when the communication device operates as a facsimile device.

Alternatively, the communication device may operate in any one of a plurality of operation modes including a mode in which the communication device has a function of a facsimile device, and the indicating system may indicate the number of pieces of data counted by the data counting system regardless of the operation mode of the communication device.

According to further aspects, there is provided a method of indicating information regarding received data for a communication device connectable to a terminal device which can perform a data communication with the communication device, the communication device being capable of receiving data through another communication device via a communication network, the method including the steps of storing data received from the other communication device through the communication network, transmitting the data stored in the data storing system, counting the number of pieces of data stored in the data storing system and have not yet been transmitted to the terminal device, and indicating the number of pieces of data counted by the step of counting.

According to further aspects of invention, there is provided a computer program product comprising computer readable instructions that cause a computer to function as a multi function device having a function of a facsimile device and a function of a non-facsimile device, the multi function device being connectable to a terminal device which can perform a data communication. The multi function device may include a mode setting system configured to set the multi function device to operate to realize one of the function of the facsimile device and the function of the non-facsimile device, a displaying system that displays indication corresponding to the mode set by the mode setting system, a data receiving system that receives data transmitted from another device, a data storing system that stores the data received by the data receiving system, a data transmission setting system that sets whether the data received by the data receiving system is to be transmitted to the terminal device, a data transmitting system that transmits the data received by the data receiving system to the terminal device if the data transmission setting system sets that the data received by the data receiving system is to be transmitted to the terminal device, an untransmitted data counting system that counts the number of pieces of untransmitted data which are stored in the received data storing system and have not yet been transmitted to the terminal device by the data transmitting system, and a first untransmitted data number displaying system that displays the number of pieces of the untransmitted data counted by the untransmitted data counting system when the operation mode set by the mode setting system is the a facsimile mode.

First Embodiment

Referring to the accompanying drawings, illustrative embodiments of the invention will be described in detail.

FIG. 1 shows a block diagram of a communication system including an MFD (Multi Function Device) 1 according to a first embodiment of the invention. The communication system includes, as shown in FIG. 1, the MFD 1 having a facsimile function, etc. and a PC (Personal Computer) 2 which is connected to the MFD 1 so that data communication can be carried out therebetween. Further, as shown in FIG. 1, the MFD 1 is connected to a telephone line network 100.

According to the first embodiment, the MFD 1 has a function of transmitting/receiving facsimile data through the telephone line network 100, a function of realizing a voice communication via the telephone line network 100, a printer function, and a copier function, a scanner function. The MFD 1 further includes a media print function that is capable of printing image data (e.g., a photo-image data) stored in a removable recording medium. In addition to the above, the MFD 1 further includes a PC-FAX function which is a function of transmitting received facsimile data to the PC 2.

As shown in FIG. 1, the MFD 1 is provided with a CPU (Central Processing Unit) 12, a ROM (Read Only Memory) 14, a RAM (Random Access Memory) 16, a scanner unit 22, a printer unit 24, a modem 26, a network control unit 28, a handset 32, an operation unit 34, an LCD (Liquid Crystal Display) 36, a speaker unit 38, a media slot 40, a PC I/F (interface) 42 and a LAN I/F 44.

The CPU 12 controls the entire operation of the MFD 1. The ROM 14 stores various programs to be executed by the CPU 12 and parameter data The RAM 16 is a memory temporarily stores data/program necessary for various procedures executed by the CPU. The handset 32 is configured to be detachable from the main body of the MFD 1 and used for transmission/reception of voice signals when the voice communication is carried out. The operation unit 34 includes a plurality of operation input keys (buttons/switches) for realizing various functions. The LCD 36 is a device that displays various kinds of information regarding the MFD 1. The speaker unit 38 includes a speaker and a driving circuit that drives the speaker. The media slot 40 is a receptacle of a removable medium. The PC I/F 42 interfaces a connection of the MFD 1 with the PC 2 via a communication cable 42a, and the LAN I/F 44 interfaces a communication of the MFD 1 with a LAN 200 via a cable or radio.

The CPU 12, the ROM 14, the RAM 16, the scanner unit 22, the printer unit 24, the modem 26, the network control unit 28, the operation unit 34, the LCD 36, the speaker unit 38, the media slot 40, the PC I/F (interface) 42 and the LAN I/F 44 are interconnected through a bus line 46. The network control unit 28 is connected with the modem 26 or the handset 32 via through a transmission path described later.

The scanner unit 22 scans an original set at a predetermined scanning position (not shown) to capture an image of the original and generates image data representing the captured image under control by the CPU 12. The scanner unit 22 is provided with an original feeding motor (not shown).

If the operation mode of the MFD 1 is set to the facsimile mode (hereinafter referred to as a FAX mode) in which the facsimile function is activated, the image data generated by the scanner unit 22 is transmitted to a destination designated by a telephone number via the modem 26, network control unit 28 and the telephone line network 100.

If the operation mode of the MFD 1 is set to the copier mode (hereinafter referred to as a COPY mode) in which the copier function is activated, the image data generated by the scanner unit 22 is printed on a recording sheet by the printer unit 24.

If the operation mode of the MFD 1 is set to the scanner mode (hereinafter referred to as a SCAN mode) in which the scanner function is activated, the image generated by the scanner unit 22 is stored in a predetermined storage in the RAM 16.

The printer unit 24 includes an inkjet printer that prints out images on a recording sheet set at a predetermined sheet feed position (not shown) under control of the CPU 12. The printer unit 24 includes a sheet feeding motor (not shown), a print head (not shown) ejecting ink drops to the recording sheet, and a carriage motor (not shown) that moves a carriage (not shown) mounting the print head.

If the operation mode of the MFD 1 is set to the FAX mode, and is set to print out the facsimile data received from the other device through the telephone line network 100, the network control unit 28 and the modem 26, image data is generated based on the received facsimile data, and is printed by the printer unit 24 on the recording sheet.

If the operation mode of the MFD 1 is set to the COPY mode, the image data generated by the scanner unit 22 is printed on the recording sheet by the printer unit 24. If the operation mode of the MFD 1 is a photo capture mode (hereinafter, referred to as a PCC mode) in which the media print function is activated, the image data stored in the removable media (not shown) that is inserted in the media slot 40 is printed on the recording sheet by the printer unit 24.

The modem 26 modulates the image data generated by the scanner unit 22 to generates image signal which can be transmitted to the telephone line network 100 via the network control unit 28, and also demodulates the image signal received from the telephone line network 100 via the network control unit 28 to generate the image data.

The network control unit 28 receives/transmits various signals from/to the telephone line network 100. Further, the network control unit 28 sets the transmission path which serves as destination/origin of the signals received from/transmitted to the telephone line network 100.

As the transmission path, a path directed to the modem 26 is set, when the operation unit 34 is operated to transmit the image (i.e., facsimile data) or when the image signal (i.e., facsimile data) is received from the telephone line network 100.

The transmission path set as above is released when the output of the image signal by the modem 26 has been completed, or when the reception of the image signal from the telephone line network 100 has been completed, and thereafter, the image signal cannot be transmitted through the transmission path.

When the user picks up the handset 32 from the main body of the MFD 1 (i.e., Off-hook operation is carried out), a path directed from the network control unit 28 to the handset 32 is set as the transmission path, and the voice signal can be transmitted through the thus determined path. The transmission path is released when the handset 32 is returned onto the main body of the MFD 1 (i.e., On-hook operation is carried out), and thereafter, the voice signal cannot be transmitted through the transmission path.

The media slot 40 is for receiving a removable media (e.g., compact flash®, memory stick®, smart media®) that stores image data captured by, for example, a digital camera. Such media is detachably inserted in the media slot 40. When the operation mode of the MFD 1 is the PCC mode, the image data stored in the removable media inserted in the media slot 40 is directly retrieved, which is printed by the printer unit 24.

The RAM 16 includes a PC-FAX memory 16a and the PC untransmission counter 16b. The PC-FAX memory 16a is a storage that stores the received FAX data which has not yet transmitted to the PC 2 (hereinafter, referred to as untransmitted FAX data) and a status of the untransmitted FAX data in relationship to each other when the operation mode of the MFD 1 is set to carry out the PC-FAX function which transmits the received FAX to the PC 2.

The PC-FAX memory 16a includes a first PC-FAX memory 16a1 to an n-th PC-FAX memory 16an, which correspond to the number "n" of pieces of untransmitted FAX data. Specifically, the oldest untransmitted FAX data and its status are stored in the first PC-FAX memory 16a1. The other data is stored similarly in the chronological order, and the latest untransmitted FAX data and its status are stored in the n-th PC-FAX memory 16an.

Each of the first to n-th PC-FAX data memories 16a1-16an has an x-th received FAX data memory 16ax1 (x=1 to n) and an x-th print completion flag 16ax2 (x=1 to n). The x-th received FAX data memory 16ax1 (x=1 to n) is a memory storing the x-th untransmitted FAX data (i.e., the received FAX data which has not yet transmitted to the PC2).

The x-th print completion flag 16ax2 (x=1 to n) is a flag indicating whether an image corresponding to the untransmitted FAX data stored in the corresponding x-th received FAX data memory 16ax1 has been printed in the printer unit 24. Specifically, the x-th print completion flag 16ax2 (x=1 to n) is set to "0" if the image corresponding to the untransmitted FAX data stored in the x-th received FAX data memory 16ax1 has not yet printed in the printer unit 24, while set to "1" if printed in the printer unit 24. If new untransmitted FAX data is to be stored in the x-th received FAX data memory 16ax1 of the x-th PC-FAX memory 16ax1 of the x-th received FAX data memory 16ax1, the x-th print completion flag 16ax2 is set to its initial value of "0".

The PC untransmission counter 16b counts the number of pieces of untransmitted FAX data. The value of the PC untransmission counter 16b is set to "0" if there is no untransmitted FAX data stored in the PC-FAX memory 16a. The counter 16b is incremented by one every time when a new piece of untransmitted FAX data is stored in the x-th received FAX data memory 16ax1 of the x-th PC-FAX memory 16ax. On the other hand, if one piece of untransmitted FAX data is transmitted to the PC2 in a PC-FAX data transmission procedure (described later with reference to FIG. 6), the PC untransmission counter 16b is decremented by 1.

Figure 2:
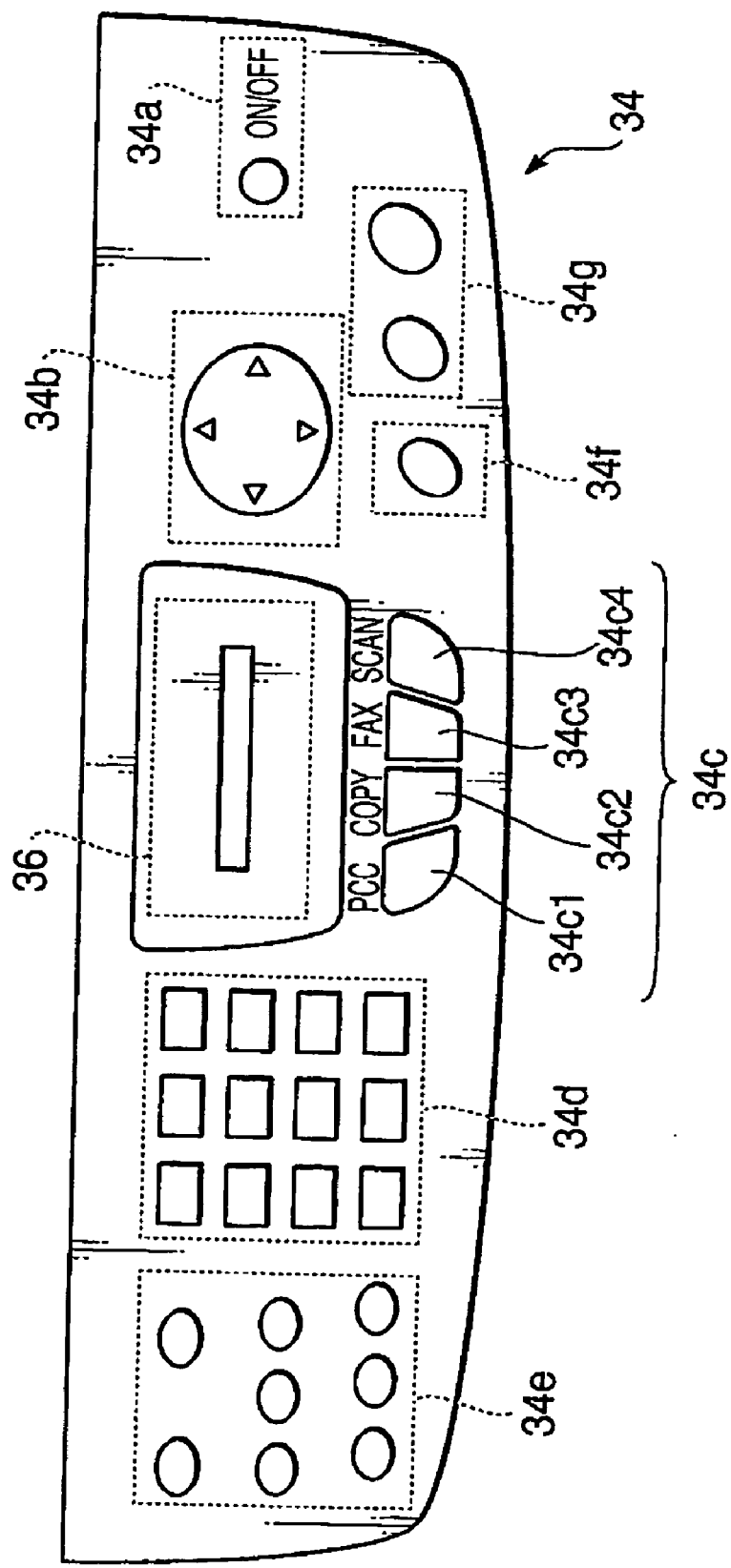
FIG. 2 is a plan view of an operation panel of the MFD shown in FIG. 1 in accordance with aspects of the present invention.

Next, referring to FIG. 2, the operation panel of the MFD 1 will be described. FIG. 2 is a plan view of the operation panel. FIG. 2 is a plan view of the operation panel. As shown in FIG. 2, the operational panel portion includes various input keys 34a-34g and an LCD 36.

The input key 34a is a power button. If the input key 34 is depressed when the MFD 1 is powered OFF, power is supplied to the MFD 1 (i.e., the MFD 1 is powered ON). If the input key 34 is depressed when the MFD 1 is powered ON, the MFD 1 is powered OFF.

The input key 34b is an arrow key for selecting one of items indicating a function to be realized by the MFD 1 or a parameter to be used from among a list of items displayed on the LCD 36. By depressing upper/lower/right/left end of the input key 34b, a cursor displayed on the LCD 36 together with the list of selective items is moved, thereby one of the displayed items is selectively highlighted. When a desired item is highlighted by operating the input key 34b, and then by depressing the central part of the input key 34b, the selection of the highlighted item is established, and the function/parameter is set to be realized/used by the MFD 1.

In particular, when the MFD 1 is to be set to operate as the PC-FAX, an item to turn ON the PC-FAX setting is selected from among the listed items displayed on the LCD 36, and the center of the input key 34b is depressed. Further, when the MFD 1 is set to operate as the PC-FAX, if an item representing a setting to make the MFD 1 to print out the image with the printer unit 24 when it is transmitted to the PC 2 (hereinafter, referred to a backup print setting) is selected and the center of the input key 34b is depressed, the backup print setting is turned ON.

The input keys 34c are mode selection keys 34c, which includes a PCC mode key 34c1 that activates the media print function in the MFD 1, a COPY mode key 34c2 that activates the COPY function of the MFD 1, a FAX mode key 34c3 that activates the facsimile function of the MFD 1, and a SCAN mode key 34c4 that activates the scanner function of the MFD 1. When one of the mode selection keys 34c (i.e., 34c1-34c4) is depressed, the MFD 1 is set to operate in accordance with the function corresponding to the depressed one of the mode selection keys 34c (34c1-34c4).

The input keys 34d are ten keys, which are typically used when the MFD 1 operates in the FAX mode and a telephone number of the destination to which the facsimile data is to be transmitted is input, or some setting parameters are input.

The input keys 34e are setting buttons which are used to designate a predetermined function in each operation mode (e.g., an on-hook dialing function in the FAX mode).

The input key 34f is a stop button that is depressed to instruct the MFD 1 to stop operating when a selected function is carried out.

The input key 34g is a start button that is depressed to instruct the MFD 1 to start operating when the FAX mode or COPY mode has been selected.

The LCD 36 displays various pieces of information and parameters for the MFD 1. Besides the information/parameters related to the operating functions/parameter settings described above, for example, current setting conditions are displayed as standby information when the MFD 1 is in the standby mode.

Next, referring to FIGS. 3A-3P, display on the LCD 36 of the MFD 1 will be described. FIGS. 3A-3H show various examples of the standby display on the LCD 36 in various operation modes of the MFD 1. Specifically, in FIGS. 3A-H show examples when the LCD 36 is a one-line display model, while FIGS. 3I-3P show examples when the LCD 36 is a two-line display model.

Among examples for one-line display LCD 36, FIGS. 3A-3D show the indications when there are no untransmitted FAX data in the PC-FAX memory 16a.

FIG. 3A shows the indication at the standby state when the MFD 1 operates in the FAX mode. As shown in FIG. 3A, on the LCD 36, date and time (06/11 15:12) are displayed, and on the right-hand side of the date and time, a character string "F/T" that represents a setting in which the facsimile function and telephone function are automatically switched is displayed. The character string "F/T" may be replaced with "FAX" representing the facsimile transmission/reception function, or "TEL" representing the voice communication function in accordance with the operation mode of the MFD 1.

In FIG. 3B shows the indication at the standby state when the MFD 1 operates in the COPY mode. In this example, a character string "100%" representing the magnification/reduction ratio of the output is displayed. On the right-hand side of the magnification/reduction ratio, a character string "Normal" representing the quality of the output is displayed. On the right-hand side of the quality indication, the number of copied sheets (i.e., 01) is indicated.

In FIG. 3C shows the indication at the standby state when the MFD 1 operates in the SCAN mode. In this example, a character string "Scan: Select" is displayed so that the user can recognize that image data, which is generated by the scanner unit 22 and stored in a predetermined storage of the RAM 16, should be selected by the user. On the right-hand side of the character string, two opposite arrows, which notify the user that desired data can be selected from among the image data stored in the RAM 16 of the MFD 1, are displayed.

In FIG. 3D shows the indication at the standby state when the MFD 1 operates in the PCC mode. In this example, a character string "Scan: Select" is displayed so that the user can recognize that image data, which is generated by the scanner unit 22 and stored in a predetermined storage of the RAM 16, should be selected by the user. On the right-hand side of the character string, two opposite arrows, which notify the user that desired data can be selected from among the image data stored in the RAM 16 of the MFD 1, are displayed.

When the indication of FIG. 3C or 3D is displayed on the LCD 36, the user can move the cursor by operating the input key 34b to highlight one of the arrows, and then the user can select desired image data by operating the central part of the input key 34b.

FIGS. 3E-3H show examples when the untransmitted FAX data is stored in the PC-FAX memory 16a.

FIG. 3E shows an indication at the standby sate when the MFD 1 operates in the FAX mode. As a result of execution of the standby procedure (described later, see FIG. 7), the number of pieces of the untransmitted FAX data which have not yet transmitted to the PC 2 and stored in the RAM 16 (i.e., the PC-FAX memory 16a). The indication shown in FIG. 3E (i.e., "PC Fax Msg:003") indicates that three pieces of untransmitted FAX data are stored in the RAM 16 (i.e., the PC-FAX memory 16a).

FIGS. 3F-3H show indications on the LCD 36 in the COPY mode, SCAN mode and PCC mode, respectively, when the untransmitted FAX data is stored in the PC-FAX memory 16a. As is understood from the FIGS. 3F-3H, the indications are the same as FIGS. 3B-3D which are the indications when no untransmitted FAX data is stored in the PC-FAX memory 16a.

As shown in FIGS. 3A-3H, in the MFD 1 according to the first embodiment, when the untransmitted FAX data is stored in the PC-FAX memory 16a, the number of the pieces of the untransmitted FAX data is displayed on the LCD 36 only in the standby indication in the FAX mode.

FIGS. 3I-3P show standby indications on the LCD 36 of two-line display type, and FIGS. 3I-3L show indications when no untransmitted FAX data is stored in the PC-FAX memory 16a.

Specifically, FIG. 3I shows the standby indication when the MFD 1 operates in the FAX mode. On the LCD 36, the upper line shows the indication same as that shown in FIG. 3A, while a character string "Res: Standard" indicating a setting of a resolution when the image data is transmitted is indicated in the lower line on the LCD 36.

FIG. 3J shows the standby indication in the COPY mode. On the LCD 36, the upper line is the same as the indication in FIG. 3B, while the lower line indicates a character string "Plain" representing that the recording sheet is set to the PPC sheet. On the right-hand side of the character string "Plain", an indication "A4" representing that the size of the recording sheet is A4 is displayed.

Further, FIGS. 3L and 3L show the standby indications in the SCAN mode and the PCC mode, respectively. As shown in FIGS. 3K and 3L, in these modes, the upper lines on the LCD 36 are similar to those shown in FIGS. 3C and 3D, respectively.

FIGS. 3M-3P show the standby indications when the untransmitted FAX data is stored in the PC-FAX memory 16a.

Specifically, FIG. 3M shows the standby indication when the MFD 1 operates in the FAX mode. On the lower line of the LCD 36, as the results of the standby display procedure (described later, see FIG. 7), the number of pieces of the untransmitted FAX data which have not yet transmitted to the PC 2 and stored in the RAM 16 (i.e., PC-FAX memory 16a) is displayed in a manner similar to the indication shown in FIG. 3E.

FIGS. 3N-3P are the standby indications in the COPY mode, SCAN mode and PCC mode when the untransmitted FAX data is stored in the PC-FAX memory 16a, respectively. These indications are similar to those shown in FIGS. 3J-3L for cases where no untransmitted FAX data is stored in the PC-FAX memory 16a, respectively.

As indicated in FIGS. 3I-3P, in the MFD 1 according to the first embodiment, when the untransmitted FAX data is stored in the PC-FAX memory 16a, the number of pieces of the untransmitted FAX data is indicated only in the standby indication in the FAX mode.

When the LCD 36 is of the one-line or two-line indication type, the quantity of the information displayed on the LCD 36 is restricted. When the MFD 1 operates in the COPY mode, the copy setting (i.e., magnification/reduction ratio, the number of output pages etc.) should be displayed since, without this indication, it is inconvenient for the user of the MFD 1 using it as the copier. Therefore, indications shown in FIGS. 3B, 3F, 3J, and 3N are necessary.

In the FAX mode, on the contrary, as seen in FIGS. 3A, 3E, 3I, and 3M, the current date and time are mainly displayed on the LCD 36. In the FAX mode, it would not cause any problem even if the indication of date/time is replaced with the number of pieces of the untransmitted FAX data, rather, it may be convenient for the user. Further, according to such a configuration, since the indications will not be interfered in the other modes, the operability of the MFD 1 may be improved. In addition, since the MFD 1 is mainly used in the FAX mode or COPY mode, it is more reasonable to display the number of the untransmitted FAX data in the FAX mode than in the SCAN mode or PCC mode which are used less frequently.

Next, referring to FIG. 4, a main procedure executed in the MFD 1 according to the first embodiment will be described. The procedure show in FIG. 4 is stored in the ROM 14 as a part of control program and is executed by the CPU 12.

That is, FIG. 4 shows a flowchart of the main procedure executed in the MFD 1 according to the first embodiment. The main procedure is executed when the input key 34a is operated and the MFD 1 is powered ON. The main procedure is repeatedly executed while the power is ON.

In the main procedure, control judges whether the mode selection key 34c (i.e., 3ec1-34c4) is depressed by the user (S401). If the mode selection key 34c is depressed (S401: YES), control judges whether the depressed mode key 34c is the FAX mode selection key 34c3 (S402). If the depressed mode selection key 34c is the FAX mode key 34c3 (S402: YES), control sets the operation of the MFD 1 to the FAX mode (S410) and proceeds to S406.

If the depressed mode selection key 34c is not the FAX mode key 34c3 (S402: NO), control judges whether the depressed mode selection key 34c is the COPY mode key 34c2 (S403). If the depressed mode selection key 34c is the COPY mode key 34c2 (S402: YES), control sets the operation mode of the MFD 1 to the COPY mode (S411), and proceeds to S406.

If the depressed mode selection key 34c is not the COYP mode key 34c2 (S403: NO), control judges whether the depressed mode selection key 34c is the SCAN mode key 34c4 (S404). If the depressed mode selection key 34c is the SCAN mode key 34c4 (S404: YES), control sets the operation mode of the MFD 1 to the SCAN mode (S412), and proceeds to S406.

If the depressed mode selection key 34c is not the SCAN mode key 34c4 (S404: NO), the depressed mode selection key 34c is determined to be the PCC mode key 34c1. In this case, control sets the operation mode of the MFD 1 to the PCC mode (S405), and proceeds to S406.

As above, in steps S401-S405, S410-S412, the operation mode of the MFD 1 is set in accordance with the depressed mode selection key 34c (34c1-34c4). Then, one of the standby indications shown in FIGS. 3A-3P is displayed on the LCD 36.

In S406, control judges whether the PC-FAX setting is made by the user. That is, control judges whether the user has selected, from options displayed on the LCD 36, to turn ON the PC-FAX setting by operating the input key 34b. If it is determined that the user has made the PC-FAX setting (S406: YES), control makes the reception setting of the MFD 1 to the PC-FAX setting (S413), and proceeds to S407. If the user has not made the PC-FAX setting (S406: NO), control skips S413 and proceeds to S407.

In S407, control judges whether the user has made the backup print setting. That is, is it judged whether the user has selected, from the options displayed on the LCD 36, to turn ON the backup print setting by operating the input key 34b. If it is determined that the user has made the backup print setting (S407: YES), control sets the backup print setting of the MFD 1 to ON (S414) and proceeds to S408. If the user has not set the backup print setting (S407: NO), control skips S414 and proceeds top S408.

In S408, control judges whether the user has released the backup print setting. That is, control judges whether the user has selected an OFF setting of the backup print from among options displayed on the LCD 36 by operating the input key 34b. If it is determined that the backup print setting has been released (S408: YES), control sets the backup print setting to OFF (S415), and proceeds to S409. If it is determined that the backup setting has not been released (S408: NO), control skips S415 and proceeds to S409.

In S409, control executes various operations in each mode (e.g., transmission of FAX data in the FAX mode) in accordance with an instruction or procedures corresponding to input other than those performed in S401-S408 (e.g., instruction to release the PC-FAX mode setting). After S409 is executed, control proceeds to S401, and repeats steps S401-S415.

Next, referring to FIGS. 5 and 6, a procedure to handle the received FAX data when the PC-FAX setting of the MFD 1 is turned ON. FIG. 5 is a flowchart illustrating a PC-FAX data reception procedure executed in the MFD 1, and FIG. 6 is a flowchart illustrating a PC-FAX data transfer procedure, which is a part of the PC-FAX data reception procedure shown in FIG. 5. The procedures shown in FIGS. 5 and 6 are stored, as control programs to be executed by the CPU 12, in the ROM 14.

The PC-FAX data reception procedure shown in FIG. 5 is a procedure which is started up when the PC-FAX setting of the MFD 1 is turned ON, and the FAX data is received. It should be noted that the FAX data which triggers the PC-FAX data reception procedure may be either facsimile data which is received from a sending station through the telephone line network 100, or internet facsimile data transmitted from a sending station through the LAN 200.

In the PC-FAX data reception procedure, the received FAX data is stored in a (k+1)-th received FAX data memory 16a (k+1)1 in a newly added (k+1)-th PC-FAX memory 16a(k+1) in the PC-FAX memory 16a (S501). It should be noted that a variable k in S501 is equal to the value of x of the PC untransmission counter 16b when the FAX data is received. For example, when the value of x of the PC untransmission counter 17b when the FAX data is received is zero, i.e., when no untransmitted FAX data is stored in the PC-FAX memory 16a, the received FAX data is stored in the first FAX data memory 16a11 of the first PC-FAX memory 16a1.

After execution of S501, the value k of the PC untransmission counter 16b is incremented by one (S502). As S502 is executed, the value k of the PC untransmission counter 16b represents the number of pieces of the FAX data which have not transmitted to the PC 2.

After S502 is finished, the PC-FAX data transfer procedure for transmitting the received FAX data and/or untransmitted FAX data to the PC 2 is executed (S503), and the PC-FAX data reception procedure is finished.

Next, referring to FIG. 6, the PC-FAX data transfer procedure (S503) will be described in detail. As shown in FIG. 6, in the PC-FAX data transfer procedure (S503), control judges whether the backup print setting is turned ON (S601). If the backup print setting is turned ON (S601: YES), control judges whether printer unit 24 can performs a printing operation, e.g., whether the recording sheet is set at the predetermined sheet feed position (not shown), or whether the remaining amount of the ink is sufficient for printing (S602). If the printing operation by the printer unit 24 can be executed (S602: YES), a variable y is set to one (S603), and control judges whether the y-th print completion flag 16ay2 is ON, i.e., whether an image corresponding to the received FAX data stored in the y-th received FAX data memory in relation to the y-th print completion flag in the y-th PC-FAX memory 16ay is printed on the recording sheet (S604). In S604 following S603, control judges whether the first print completion flag 16a12 is ON.

If the y-th print completion flag 16ay2 is OFF, i.e., if the image corresponding to the FAX data stored in the y-th received FAX data memory has not yet printed on the recording sheet (S604: NO), the image corresponding to the FAX data stored in the y-th received FAX data memory is printed by the printer unit 24 (S605), and the y-th print completion flag 16ay2 is turned ON (S606). Then, control proceeds to S607.

If the printer 24 cannot print the image (S602: NO), control skips steps S603 through S606, and proceeds to S607. If the y-th print completion flag is ON, control skips S605 and S606, and proceeds to S607.

In S607, control judges whether the FAX data can be transmitted to the PC 2, i.e., whether the PC 2 has started up and the dedicated application for enabling the communication between the MFD 1 and the PC 2 has been running through, for example, a USB terminal of the PC I/F 42.

If it is determined that the FAX data can be transmitted to the PC 2 (S607: YES), control transmits the FAX data stored in the first received FAX data memory 16a11 to the PC 2 as a single file (S608). Next, in S609, control judges whether a transmission completion signal is received from the PC 2 that received the FAX data within a predetermined period (e.g., five seconds) after the FAX data has been transmitted in S608 to the PC 2. If it is determined that the transmission completion signal has not been received within the predetermined period after the execution of S608 (S609: NO), control finishes the PC-FAX data transfer procedure (S503).

If the transmission completion signal is received from the PC 2 within the predetermined period after execution of S608 (S609: YES), control deletes the FAX data stored in the first FAX data memory 16a11.

After execution of S610, control shifts contents of the x-th PC-FAX memory 16ax (x=2 to n) (i.e., the x-th received FAX data memory 16ax1 and x-th print completion flag 16ax2) to the (x−1)-th PC-FAX memory 16a(x−1) (S611). For example, the contents of the 2nd PC-FAX memory 16a2 (i.e., the second FAX data memory 16a21 and the second print completion flag 16a22) are shifted to the first received FAX data memory 16a11 and the first print completion flag 16a12 of the first PC-FAX memory 16a1.

After S611, control decrements the value k of the PC untransmission counter 16b by one (S612). As S612 is executed, the value k of the PC untransmission counter 16b represents the number of pieces of untransmitted FAX data which have not yet transmitted to the PC 2.

After S612, control judges whether there is data (i.e., the received FAX data stored in the first received FAX data memory 16a11) in the first PC-FAX memory 16a1 (S613). If it is determined that no data is stored in the first PC-FAX memory 16a1 (S613: NO), control finishes the PC-FAX data procedure. If it is determined that there is data in the first PC-FAX memory 16a1 (S613: YES), control proceeds to S603, and repeats steps S603 through S613.

If, in S607, it is judged that the FAX data cannot be transmitted to the PC 2 (S607: NO), control judges whether the variable y equals to k (k being the value of the PC untransmission counter). That is, control judges, for the latest received FAX data stored in the k-th FAX data memory, whether steps S604 through S606 have been executed (S614).

As a result of the judgment in S614, if it is determined that the variable y equals to k (S614: YES), control finishes the PC-FAX data transfer procedure (S503). If the variable y is less than k (y<k) (S614: NO), then control increments the variable 1 by one (S615), and proceeds to S604.

As the steps S602-S607 and S614-S615 are executed, when the backup print setting is turned ON, if the MFD 1 is in a condition where the printing can be performed by the printer unit 24 but the data cannot be transmitted to the PC 2, an image corresponding to the FAX data stored in the PC-FAX memory as the received FAX data (or the untransmitted FAX data) is printed, by the printer unit 24, on the recording sheet. Thus, even if the received FAX data or the untransmitted FAX data cannot be transmitted to the PC 2, the user can review the contents of the received FAX data (or the untransmitted FAX data) since it is printed on the recording sheet. The MFD 1 may be configured such that, if the user reviews the thus printed image on the recording sheet, and judges that transmission of the data to the PC 2 is unnecessary, the data can be deleted from the RAM 16 (PC-FAX memory 16a) in response to a predetermined operation. If the MFD 1 is configured in such a manner, it is advantageous that the capacity of the memory can by obtained for the PC-FAX memory 16a.

Further, as the steps S602-S607 and S614-S615 are executed, when the backup print setting is turned ON, if the FAX data stored in the PC-FAX memory 16a as the received FAX data (or the untransmitted FAX data) cannot be transmitted to the PC 2, although the corresponding image is printed on the recording sheet by the printer unit 24, S610 is not executed and the received FAX data (or the untransmitted FAX data) is maintained. Accordingly, the received FAX data (or the untransmitted FAX data) is effectively used since the images are printed on the recording sheet in accordance with the FAX data as well as the data is transmitted to the PC 2 as a file.

When the backup print setting is turned ON, if the MFD 1 can transmits data to the PC 2 but the printer unit 24 cannot print images, in S608-S610, the data is deleted from the RAM 16 (PC-FAX memory 16a) if it is confirmed that the data is transmitted to the PC 2 successfully. Therefore, data transmission to the PC 2 can be performed efficiently.

As a result of judgment in S601, if the backup print setting is turned OFF (S601: NO), similar to the step in S607 above, control judges whether the received FAX data can be transmitted to the PC 2 (S616). If it is possible to transmits the FAX data to the PC 2 (S616: YES), the FAX data stored in the first received FAX data memory 16a11 is transmitted to the PC 2 as one file (S617). Next, after the FAX data has been transmitted to the PC 2 (S617), control judges (S618) whether the transmission completion signal is received from the PC 2 that received the FAX data within a predetermined period (e.g., five seconds). If the transmission completion signal has not been received from the PC 2 within the predetermined period after execution of S617 (S618: NO), control finishes the PC-FAX data transmission procedure (S503).

If the transmission completion signal has been received from the PC 2 within the predetermined period after execution of S617 (S618: YES), control deletes the FAX data stored in the first received FAX data memory 16a11 (S619).

After execution of S619, control shifts the contents of the x-th PC-FAX memory 16ax (x=2 to k) (i.e., the x-th received FAX data memory 16ax1 and the x-th print completion flag 16ax2) to the (x−1)-th PC-FAX memory 16a(x−1) in S620. For example, the contents of the second PC-FAX memory 16a2 (i.e., the second received FAX data memory 16a21 and the second print completion flag 16a22) to the first FAX data memory 16a11 and the first print completion flag 16a12 of the first PC-FAX memory 16a12.

After execution of S620, control decrements the value k of the PC untransmission counter 16b by one (S621). As S620 is executed, the value k of the PC untransmission counter 16b represents the number of pieces of untransmitted FAX data which have not transmitted to the PC 2.

After execution of S621, control judges whether there is data in the first PC-FAX memory 16a1 (the received FAX data stored in the first FAX data memory 16a11) in S622. If there is no data in the first PC-FAX memory 16a1 (S622: NO), control finishes the PC-FAX data procedure. If there is data in the first PC-FAX memory 16a1 (S622: YES), control proceeds to S617, and repeats the steps S617 through S622.

By execution of S608-S610 or S617-S619, transmission of the received FAX data (or the untransmitted FAX data) to the PC 2 is confirmed, and then, the received FAX data corresponding to the transmitted data is deleted from the RAM 16 (PC-FAX memory 16a) of the MFD 111. Therefore, unintentional deletion of the received FAX data (or the untransmitted FAX data) due to failure of transmission can be avoided.

In S608-S610 or in S617-S619, the received FAX data (or the untransmitted FAX data) to be transmitted to the PC 2 is transmitted as a unit of received FAX data (or untransmitted FAX data). That is, the received FAX data (or the untransmitted FAX data) is transmitted such that a piece of received FAX data (or the untransmitted FAX data) stored in the x-th received FAX data memory 16*a*x1 (x=1 to k) is transmitted as a single file. Therefore, management of the received FAX data at the PC 2 side can be simplified. Further, when there are a plurality of pieces of untransmitted FAX data in the PC-FAX memory 16*a*, if the transmission of the received FAX data (or the untransmitted FAX data) to the PC 2 is failed due to transmission errors or shut off of the power, at least the files having been transmitted before the transmission failure need not be re-transmitted, and the data transmission job can be made efficient.

Next, referring to FIG. 7, the standby indications in respective operation modes (FAX mode, COPY mode, SCAN mode and PCC mode) of the MFD 1 according to the first embodiment will be described. FIG. 7 shows a flowchart illustrating the standby indication procedures executed in the MFD 1.

The standby indication procedure shown in FIG. 7 is started when the MFD 1 is in the standby state in which the MFD 1 is powered ON but does not execute a specific operation. In S701, control judges whether the operation mode of the MFD 1 is the FAX mode. If the operation mode of the MFD 1 is the FAX mode (S701: YES), control judges whether the value k of the PC untransmission counter 16*b* is one or greater, that is, whether there is received FAX data (untransmitted FAX data) which has not yet transmitted to the PC 2 is stored in the PC-FAX memory 16*a* (S702).

If the value k of the PC untransmission counter 16*b* is one or greater (S702: YES), control refers to the value k of the PC untransmission counter 16*b* and displays the number of pieces of the untransmitted FAX data (i.e., the number k) on the LCD 36 (S703). If the LCD 36 is the one-line type display, the indication as illustrated in FIG. 3E is displayed.

After execution of S703, control judges whether the standby status of the MFD 1 is released (S704). If the standby status of the MFD 1 is released (S704: YES), control finishes the standby indication procedure. When the standby indication procedure is finished, an indication corresponding to the operational status of the MFD 1 (e.g., transmission of facsimile data) will be displayed on the LCD 36.

If the value k of the PC untransmission counter 16*b* is zero (S702: NO), control displays the standby indication for the FAX mode on the LCD 36 (S706), and proceeds to S704. If the LCD 36 is the one-line type display, the indication as shown in FIG. 3A will be displayed on the LCD 36.

If the operation mode of the MFD 1 is a mode other than the FAX mode (i.e., the COPY mode, SCAN mode, or PCC mode) (S701: NO), control displays the standby indication corresponding to the operation mode on the LCD 36 (S705), and proceeds to S704. If the MFD 1 is the COPY mode, regardless whether the untransmitted FAX data is stored in the PC-FAX memory 16*a*, the standby indication as shown in FIG. 3B or 3F will be displayed on the LCD 36, if it is the one-line type display.

If the MFD 1 is in the standby status (S704: NO), control proceeds to S701, and repeats the steps S701-S703, and S705-S706.

As described above, in the MFD 1 according to the first embodiment, when the MFD 1 is set to transmit the received FAX data to the PC 2 (i.e., the PC-FAX setting), and if there is untransmitted FAX data which has not been transmitted to the PC 2 since the PC 2 is not powered ON or other reasons, the number of pieces of the untransmitted FAX data is displayed when the operation mode of the MFD 1 the FAX mode. Accordingly, when the MFD 1 operates in the FAX mode, the standby indication displayed on the display includes, as shown in (c) of FIG. 3, the date and current time. It is appropriate to replace the date and time with the number of pieces of the untransmitted FAX data when the untransmitted FAX data exists. Further, when the MFD 1 operates in another mode, the displayed indication will not be interfered by the number of the untransmitted FAX data. Therefore, the above configuration improves the operability of the MFD 1.

While the received FAX data (or the untransmitted FAX data) cannot be transmitted from the MFD 1 to the PC 2, at least the number of pieces of untransmitted FAX data is displayed on the LCD 36, the user can recognize the situation. Thus, the user may probably make the MFD 1 and/or PC 2 so that the transmission can be carried out, and it is ensured that the untransmitted FAX data will be transmitted to the PC 2.

The MFD 1 according to the first embodiment transmits the data, which has been stored in the PC-FAX memory 16*a* as the untransmitted data, to the PC 2 as a single file for each unit. Therefore, the PC 2 can manage the data relatively easily. Further, since a single piece of data (received FAX data or untransmitted FAX data) is transmitted as a single file, even if transmission of a certain file is failed, the previously transmitted files can be maintained in the PC 2 (i.e., the previously transmitted files need not be retransmitted), which improves efficiency of data transmission procedure.

In the MFD 1 according to the first embodiment, when the received FAX data (or the untransmitted FAX data) is transmitted to the PC 2, and if it is confirmed that the transmission is completed successfully, the data corresponding to the transmitted data is deleted from the PC-FAX memory 16*a*. In other words, only the data (the received FAX data or the untransmitted FAX data) successfully transmitted to the PC 2 is deleted from the memory of the MFD 1 (PC-FAX memory 16*a*). Therefore, the data which could not be transmitted due to, for example, transmission error, will not be deleted.

The MFD 1 is capable of printing the image corresponding to the received FAX data with the printer unit 24 in addition to transmission of the received FAX data to the PC 2, depending on the setting. Therefore, the user can review the contents of the received data immediately. Further, the user can determine whether the image corresponding to the received FAX is to be printed with the printer unit 24. Accordingly, the operability of the MFD 1 is enhanced, and further, unnecessary printing operation can be avoided and useless consumption of the recording sheets can be prevented.

When the MFD 1 operates to transmit the received FAX data to the PC 2 and also print an image corresponding to the received FAX data with the printer unit 24, if the printer unit 24 prints out the image but the received FAX data is not transmitted to the PC 2, the received FAX data (or the untransmitted FAX data) is maintained in the PC-FAX memory 16*a*. Therefore, the received FAX data is not only recorded on a recording medium, but is transmitted to the PC 2, or a communication terminal as a file. B When the MFD 1 operates to transmit the received FAX data to the PC 2 and prints the image corresponding to the received FAX data with use of the printer unit 24, and if the image is printed but the received FAX data (or untransmitted FAX data) is not transmitted to the PC 2, the data is retained in the PC-FAX memory 16*a*. Since the received FAX data is used such that the image is printed on the recording medium and the data is transmitted to the PC 2 without fail, if the transmitted file is stored in the PC 2, the received data can be used effectively.

Second Embodiment

Referring to FIGS. 8 and 9, indication of the number of pieces of untransmitted FAX data according to a second embodiment will be described. According to the first embodiment described above, only when the MFD 1 is in the FAX mode, the number of pieces of untransmitted FAX data is displayed on the LCD 36 when the standby indication is displayed. According to the second embodiment, if the user has made a setting so that the number of pieces of untransmitted FAX data is displayed in a mode other than the FAX mode, the indication is made also in that mode. The procedures illustrated by flowcharts shown in FIGS. 8 and 9 are stored in the ROM 14 as a part of the control program to be executed by the CPU 12.

In the following description of the second embodiment, parts of the MFD 1 and steps of various procedures similar to those in the first embodiment are indicated by the same reference numbers and step numbers, and description thereof will be omitted for brevity. Further, the PC-FAX data receiving procedure and the PC-FAX data transmitting procedure according to the second embodiment are the same as those in the first embodiment (see FIGS. 5 and 6), and description thereof will not be repeated.

FIG. 8 shows a flowchart illustrating a main procedure of the MFD 1 according to the second embodiment. Similar to the first embodiment, the main procedure is started when the MFD 1 is powered ON as the input key 34*a* is operated, and the main procedure is repeatedly executed by the CPU 12 while the power is ON.

In the main procedure according to the second embodiment, steps S401-S108 and S410-S415 are similar to those of the first embodiment (see FIG. 4). In S801, control judges whether a setting is made to transmit the received FAX data to the PC 2 in a mode other than the FAX mode (hereinafter, the setting will be referred to as "other mode PC-FAX setting").

If the user has made the other mode PC-0FAX setting (S801: YES), control makes the reception setting of the MFD 1 to the other mode PC-FAX setting (S802), and proceeds to S409. If the user has not made the other mode PC-FAX setting (S801: NO), control skips S802 and proceeds to S409, which is similar to that in the first embodiment. After execution of S409, similar to the first embodiment, control proceeds to S401, and S401-S408, S410-S415, S801-S802 are repeated.

FIG. 9 shows a flowchart illustrating a standby indication procedure executed in the MFD 1 according to the second embodiment. Similar to the first embodiment, the standby indication procedure shown in FIG. 9 is started when the MFD 1 is in a standby state.

In S901, control judges whether the other mode PC-FAX setting has been made. If the other mode PC-FAX setting has not been made (S901: NO), control executes S710-S706 depending on whether the MFD 1 operates in the FAX mode or not.

If the other mode PC-FAX setting has been made (S901: YES), control judges whether the value k of the PC untransmission counter 16*b* is one or greater in S902. If the value k of the PC untransmission counter 16*b* is one or greater (S902: YES), control refers to the value k of the PC untransmission counter 16*b* and displays the number (i.e., k) of pieces of the untransmitted FAX data on the LCD 36, and control proceeds to S704. As S901-S903 are executed, the number of pieces of the untransmitted FAX data (if any) is displayed on the LCD 36 regardless of the operation mode of the MFD 1.

If the value k of the PC untransmission counter 16*b* is zero (S902: NO), control proceeds to S705 where the standby indication corresponding to the operation mode (FAX mode, COPY mode, SCAN mode or PC mode) is displayed on the LCD 36. Therefore, if the other mode display setting is ON but there is no untransmitted FAX data, the standby indication is made corresponding to the operation mode of the MFD 1.

As described above, the MFD 1 according to the second embodiment, even if the operation mode is not the facsimile mode, the number of pieces of untransmitted FAX data is displayed on the LCD 36.

It should be noted that the invention is explained referring to illustrative embodiments. It should be appreciated by a skilled person that the invention need not be limited to the configurations of the illustrative embodiments, and various modifications can be made without departing from the scope of the invention.

For example, in the above-described embodiments, when the PC-FAX setting is turned ON, if facsimile data is received, it is stored in the PC-FAX memory 16*a* in S501 regardless whether the PC 2 is capable of carrying out data transmission. This configuration may be modified such that, when the FAX data is received and it is confirmed that the PC 2 can carry out the data transmission, the received FAX data is transmitted to the PC 2 without storing it in the PC-FAX memory 16*a*.

In the above-described illustrative embodiments, upon reception of the facsimile data, the PC-FAX data transmission procedure (see FIG. 6) is executed as a part of the PC-FAX receiving procedure (see FIG. 5), and the PC-FAX data transmission is executed to transmit the received FAX data or the untransmitted FAX data to the PC 2. As a trigger to start the PC-FAX data transmitting procedure (see FIG. 6), besides the reception of the facsimile data as above, various modification may be made. For example, the PC-FAX data transmitting procedure may be executed at every predetermined time period, or in response to the user's operation to start transmitting the untransmitted FAX data. If the PC-FAC data transmitting procedure is started up at every predetermined period or in response to the user's operation to instruct the transmission of the untransmitted FAX data, control firstly checks the PC untransmission counter 16*b*, and if the value of the counter 16*b* is zero, control finishes the PC-FAX data transmitting procedure immediately. If the value of the counter 16*b* is one or greater, control may execute steps S601 onwards.

The PC-FAX data transmitting procedure (see FIG. 6) may be modified such that, if the transmission completion signal is not received from the PC 2 within a predetermined period in S609 or S619, control may finish the procedure after outputting an error message on the LCD 36 and/or through the speaker unit 38. According to such a modification, if the received FAX data or the untransmitted FAX data is not transmitted to the PC 2 successfully, the error message is output. Therefore, the user can recognize the error condition, and may carry out a recovery operation (e.g., re-attempt to transmit the data).

According to the second embodiment, if the MFD 1 is set such that the received FAX data is transmitted to the PC 2 when the MFD 1 operates in a mode other than the FAX mode, the number of pieces of the untransmitted FAX data is displayed in the standby indications in all the operation modes. This configuration may be modified such that whether the number of pieces of the untransmitted FAX data is indicated when the MFD 1 operates in the mode other than the FAX mode is set irrespective of the mode in which the received FAX data is transmitted to the PC 2, and the indication of the number of pieces of the untransmitted FAX data is made in accordance with the setting.

What is claimed is:

1. A multi function device having a function of a facsimile device and a function of a non-facsimile device, the multi function device being connectable to a terminal device which performs data communication, the multi function device comprising:
    a processor;
    a displaying system configured to display an indication corresponding to a mode currently set for the multi function device;
    a data receiving system configured to receive facsimile data transmitted from another device different from the multi function device;
    a data storing system configured to store the facsimile data received by the data receiving system; and
    memory operatively coupled to the processor and storing computer readable instructions that, when executed, cause the multi function device to:
    define a first setting indicating whether the facsimile data received by the data receiving system is to be transmitted to the terminal device when the mode is a facsimile mode, wherein the terminal device and the multi function device correspond to a specified recipient of the facsimile data;
    define a second setting indicating whether the facsimile data received by the data receiving system is to be transmitted to the terminal device when the mode of the multi function device is a non-facsimile mode:
    transmit the data received by the data receiving system to the terminal device when the first setting indicates that the data received by the data receiving system is to be transmitted to the terminal device and the mode is the facsimile mode;
    count after transmitting the facsimile data received by the data receiving system, a number of pieces of untransmitted data which are stored in the received data storing system and have not yet been successfully transmitted to the terminal device, wherein the untransmitted data includes data that was unsuccessfully transmitted to the terminal device from the multi function device;
    display, in the displaying system, the counted number of pieces of the untransmitted data when the mode is the facsimile mode; and
    display, in the displaying system, the counted number of pieces of untransmitted data when the mode of the multi function device is the non-facsimile mode and the second setting indicates that the data received by the data receiving system is to be transmitted to the terminal device when the mode of the multi function device is the non-facsimile mode,
    wherein the counted number of pieces of untransmitted data is not displayed when the mode of the multi function device is the non-facsimile mode and the second setting indicates that the data received by the data receiving system is not to be transmitted to the terminal device when the mode of the multi function device is the non-facsimile mode.

2. The multi function device according to claim 1, wherein the computer readable instructions, when executed, further cause the multi function device to detect whether to transmit the facsimile data to the terminal device,
    wherein the displaying system displays the counted number of pieces of untransmitted data at least when the transmission of the facsimile data is not available.

3. The multi function device according to claim 1, wherein the computer readable instructions, when executed, further cause the multi function device to:
    detect whether to transmit the facsimile data to the terminal device; and
    transmit the untransmitted data stored in the data storing system such that a unit of untransmitted data is transmitted as a single file to the terminal device upon detecting that the transmission of the facsimile data is available.

4. The multi function device according to claim 1, wherein the computer readable instructions, when executed, further cause the multi function device to:
    determine whether data transmission is carried out successfully when the facsimile data received by the data receiving system is transmitted to the terminal device; and
    delete facsimile data corresponding to the transmitted data from the received data storing system in response to determining that the transmission of the facsimile data is carried out successfully.

5. The multi function device according to claim 1, further includes a backup recording system that records an image corresponding to the facsimile data received by the data receiving system on a recording medium if the data transmission setting system sets that the facsimile data received by the data receiving system is to be transmitted to the terminal device.

6. The multi function device according to claim 5, wherein the backup recording setting system is configured to set whether the backup recording system is to record the image corresponding to the facsimile data received by the data receiving system on the recording medium if the facsimile data received by the data receiving system is to be transmitted to the terminal device.

7. The multi function device according to claim 5, wherein the computer readable instructions, when executed, further cause the multi function device to:
    determine whether data transmission is carried out successfully when the facsimile data received by the data receiving system is transmitted to the terminal device; and
    retain data corresponding to the transmitted facsimile data in the received data storing system until determining that the transmission of the facsimile data is carried out successfully.

8. The multi function device of claim 1, wherein displaying the counted number of pieces of the untransmitted data is only performed when the operation mode set by the mode setting system is the facsimile mode.

9. One or more non-transitory computer readable media storing computer readable instructions that, when executed, cause an apparatus to:
    define a first setting indicating whether facsimile data received by an apparatus is to be transmitted to a terminal device when an operating mode of the apparatus is a facsimile mode, wherein the terminal device and the apparatus correspond to a specified recipient of the facsimile data;
    define a second setting indicating whether the facsimile data is to be transmitted to the terminal device when the mode of the apparatus is a non-facsimile mode;
    transmit the received facsimile data to the terminal device when the first setting indicates that the facsimile data is to be transmitted to the terminal device and the mode is the facsimile mode;
    count, after transmitting the received facsimile data, a number of pieces of untransmitted data that have not yet been successfully transmitted to the terminal device, wherein the untransmitted data includes data that was unsuccessfully transmitted to the terminal device from the apparatus;

display, when the mode is the facsimile mode, the counted number of pieces of untransmitted data; and display the counted number of pieces of untransmitted data when the mode of the apparatus is the non-facsimile mode and the second setting indicates that the received facsimile data is to be transmitted to the terminal device when the mode of the apparatus is the non-facsimile mode, wherein the counted number of pieces of untransmitted data is not displayed when the mode of the apparatus is the non-facsimile mode and the second setting indicates that the received facsimile data is not to be transmitted to the terminal device when the mode of the apparatus is the non-facsimile mode.

10. A method comprising:

defining, by an apparatus, a first setting indicating whether facsimile data received by the apparatus is to be transmitted to a terminal device when an operating mode of the apparatus is a facsimile mode, wherein the terminal device and the apparatus correspond to a specified recipient of the facsimile data;

defining a second setting indicating whether the facsimile data is to be transmitted to the terminal device when the mode of the apparatus is a non-facsimile mode;

transmitting the received facsimile data to the terminal device when the first setting indicates that the facsimile data is to be transmitted to the terminal device and the mode is the facsimile mode;

counting, after transmitting the received facsimile data, a number of pieces of untransmitted data that have not yet been successfully transmitted to the terminal device, wherein the untransmitted data includes data that was unsuccessfully transmitted to the terminal device from the apparatus;

displaying, when the mode is the facsimile mode, the counted number of pieces of untransmitted data; and displaying the counted number of pieces of untransmitted data when the mode of the apparatus is the non-facsimile mode and the second setting indicates that the received facsimile data is to be transmitted to the terminal device when the mode of the apparatus is the non-facsimile mode, wherein the counted number of pieces of untransmitted data is not displayed when the mode of the apparatus is the non-facsimile mode and the second setting indicates that the received facsimile data is not to be transmitted to the terminal device when the mode of the apparatus is the non-facsimile mode.

* * * * *